(12) United States Patent
Lee

(10) Patent No.: US 12,481,547 B2
(45) Date of Patent: Nov. 25, 2025

(54) STORAGE DEVICE FOR SETTING OPERATION PARAMETERS FOR RANDOM ACCESS MEMORY UPON POWER-ON AND OPERATION

(71) Applicant: SK hynix Inc., Gyeonggi-do (KR)

(72) Inventor: Sung Min Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 151 days.

(21) Appl. No.: 18/335,137

(22) Filed: Jun. 15, 2023

(65) Prior Publication Data

US 2024/0184657 A1 Jun. 6, 2024

(30) Foreign Application Priority Data

Dec. 1, 2022 (KR) ........................ 10-2022-0165289

(51) Int. Cl.
*G06F 11/07* (2006.01)
*G06F 11/263* (2006.01)

(52) U.S. Cl.
CPC .......... *G06F 11/076* (2013.01); *G06F 11/073* (2013.01); *G06F 11/263* (2013.01)

(58) Field of Classification Search
None
See application file for complete search history.

(56) References Cited

U.S. PATENT DOCUMENTS

| 10,067,718 | B2 | 9/2018 | Covington et al. | |
| 10,147,499 | B1* | 12/2018 | Botea | G11C 29/12 |
| 2011/0078370 | A1* | 3/2011 | Chaudhuri | G11C 7/10 |
| | | | | 711/E12.001 |
| 2021/0020258 | A1* | 1/2021 | Oh | G11C 29/10 |

FOREIGN PATENT DOCUMENTS

KR  10-2002-0017771 A  3/2002

OTHER PUBLICATIONS

NPL—Shailaja et al.—Automatic Seed Generation—IEEE—Nov. 2022 (Year: 2022).*
NPL—Zhao et al._synthesizing_circuits_for_a_specified_BIST_environment-IEEE-1998 (Year: 1998).*

* cited by examiner

*Primary Examiner* — Mark D Featherstone
*Assistant Examiner* — Matthew W Wahlin
(74) *Attorney, Agent, or Firm* — IP & T GROUP LLP

(57) ABSTRACT

A storage device may execute, upon power-on, a training operation on a pattern data chunk a number of times, and update one or more operation parameters of the random access memory when the number of maximum error bits generated during the training operation is equal to or greater than a set threshold number of bits.

13 Claims, 7 Drawing Sheets

STORAGE DEVICE FOR SETTING OPERATION PARAMETERS FOR RANDOM ACCESS MEMORY UPON POWER-ON AND OPERATION

CROSS-REFERENCE TO RELATED APPLICATION

The present application claims priority under 35 U.S.C. 119(a) to Korean patent application number 10-2022-0165289 filed on Dec. 1, 2022, which is incorporated herein by reference in its entirety.

TECHNICAL FIELD

Embodiments of the present disclosure relate to a storage device.

BACKGROUND

A storage device is a device for storing data according to a request from an external device such as a computer, a mobile terminal such as a smart phone or tablet, or the like.

The storage device may include a memory for storing data therein and a controller for controlling the memory. The memory may be a volatile memory or a non-volatile memory. The controller may receive a command from an external device (i.e., a host), and execute or control operations to read, write, or erase data in the memory included in the storage device according to the command.

Meanwhile, the storage device may use a separate random access memory (RAM) to improve the performance of the controller. In this case, the storage device may set operation parameters for the random access memory so that the random access memory will normally operate.

SUMMARY

Embodiments of the present disclosure may provide a storage device capable of setting optimal operation parameters for a random access memory.

In one aspect, embodiments of the present disclosure may provide a storage device including a random access memory, a non-volatile memory including a plurality of memory blocks which configured to store a pattern data chunk to be written to the random access memory upon power-on, and a controller configured to execute a training operation of writing the pattern data chunk to the random access memory and then reading the pattern data chunk back from the random access memory, M times, upon power-on where M is a natural number, and update one or more operation parameters for the random access memory when the number of maximum error bits generated during the training operations of M times is greater than or equal to a threshold number of bits.

In another aspect, embodiments of the present disclosure may provide an operating method of a storage device including a controller, a non-volatile memory, and a random access memory, the operating method including reading, by the controller, a pattern data chunk from the non-volatile memory upon power-on, executing, by the controller, a training operation of writing the pattern data chunk to the random access memory and then reading the pattern data chunk back from the random access memory, M times where M is a natural number, calculating, by the controller, a number of maximum error bits generated during the training operation of M times, and updating, by the controller, one or more operation parameters for the random access memory when the number of maximum error bits is greater than or equal to a threshold number of bits.

According to the embodiments of the present disclosure, it is possible to set the optimal operation parameters for the random access memory.

DETAILED DESCRIPTION

Figure 1:
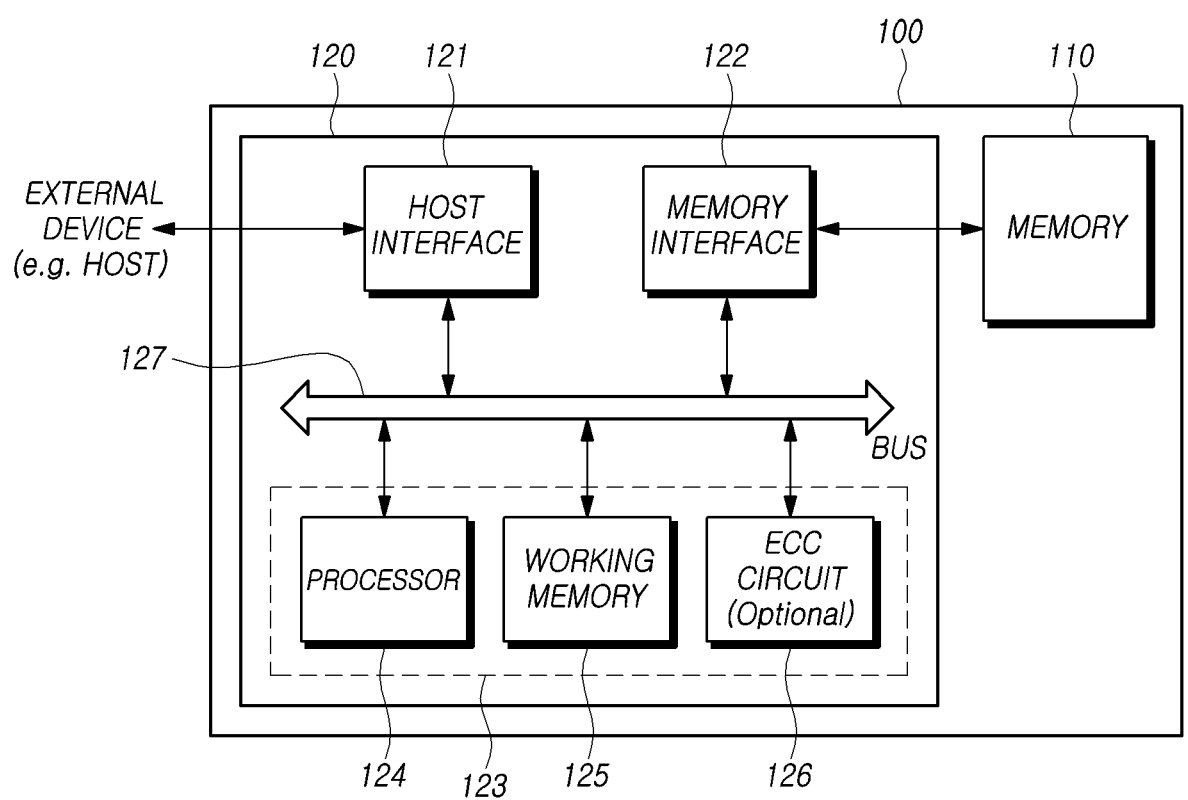
FIG. 1 is a block diagram illustrating a storage device according to an embodiment of the present disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the present disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Since the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a block diagram illustrating a storage device 100 according to an embodiment of the present disclosure.

Referring to FIG. 1, the storage device 100 may include a memory 110 that stores data and a controller 120 that controls the memory 110.

The memory 110 includes a plurality of memory blocks, and operates under the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the present disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array, which is selected by the address. The memory 110 may perform an operation instructed by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one of a garbage collection (GC) operation, a wear leveling (WL) operation, a read reclaim (RR) operation, a bad block management (BBM) operation, and so forth.

The controller 120 may control the operation of the memory 110 according to a request from an external device (e.g., a host) located outside the storage device 100. The controller 120, however, also may control the operation of the memory 110 regardless or in the absence of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be any of various electronic devices that require a storage device capable of storing data.

The host may include at least one operating system (OS). The operating system may generally manage and control the function and operation of the host, and may provide interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, descriptions will describe the controller 120 and the host as devices that are separate from each other.

Referring to FIG. 1, the controller 120 may include a memory interface 122, a control circuit 123, and a host interface 121.

The host interface 121 may provide an interface for communication with the host. For example, the host interface 121 may provide an interface that uses at least one of various communication standards or interfaces such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is, the memory interface 122 may provide an interface between the memory 110 and the controller 120 under the control of the control circuit 123.

The control circuit 123 may perform the general control operations of the controller 120 to control the operation of the memory 110. To this end, for instance, the control circuit 123 may include a processor 124 and a working memory 125, and may further include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate the logical block address (LBA) into the physical block address (PBA), by using a mapping table.

There are various address mapping methods of the flash translation layer, depending on a mapping unit. Representative address mapping methods include a page mapping method, a block mapping method, and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, an operation of the storage device 100 according to an embodiment of the present disclosure will be described as implementing a processor 124 that executes firmware in which the corresponding operation is defined.

Firmware, which is a program to be executed in the storage device 100 to drive the storage device 100, may include various functional layers. For example, the firmware may include binary data in which codes for executing the functional layers, respectively, are defined.

For example, the firmware may include at least one of a flash translation layer (FTL) which performs a translating function between a logical address requested to the storage device 100 from the host and a physical address of the memory 110; a host interface layer (HIL) which serves to analyze a command requested to the storage device 100 as a storage device from the host and transfers the command to the flash translation layer (FTL); and a flash interface layer (FIL) which transfers a command instructed from the flash translation layer (FTL), to the memory 110.

Such firmware may be loaded in the working memory 125 from, for example, the memory 110 or a separate non-volatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware, in which a logic calculation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata used for driving firmware from the memory 110. The metadata, which is data for managing the memory 110, may include, for example, management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store firmware, a program code, a command and data. The working memory 125 may be a volatile memory that includes, for example, at least one of an SRAM (static RAM), a DRAM (dynamic RAM) and an SDRAM (synchronous DRAM).

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate (BER) is higher than a reference value, the error detection and correction circuit 126 may determine that a corresponding sector is uncorrectable or a fail. On the other hand, when a bit error rate (BER) is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector which is uncorrectable in read data last. There may be one or more sectors that are determined to be uncorrectable. The error detection and correction circuit 126 may transfer information (e.g., address information) regarding a sector which is determined to be uncorrectable to the processor 124.

A bus 127 may provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
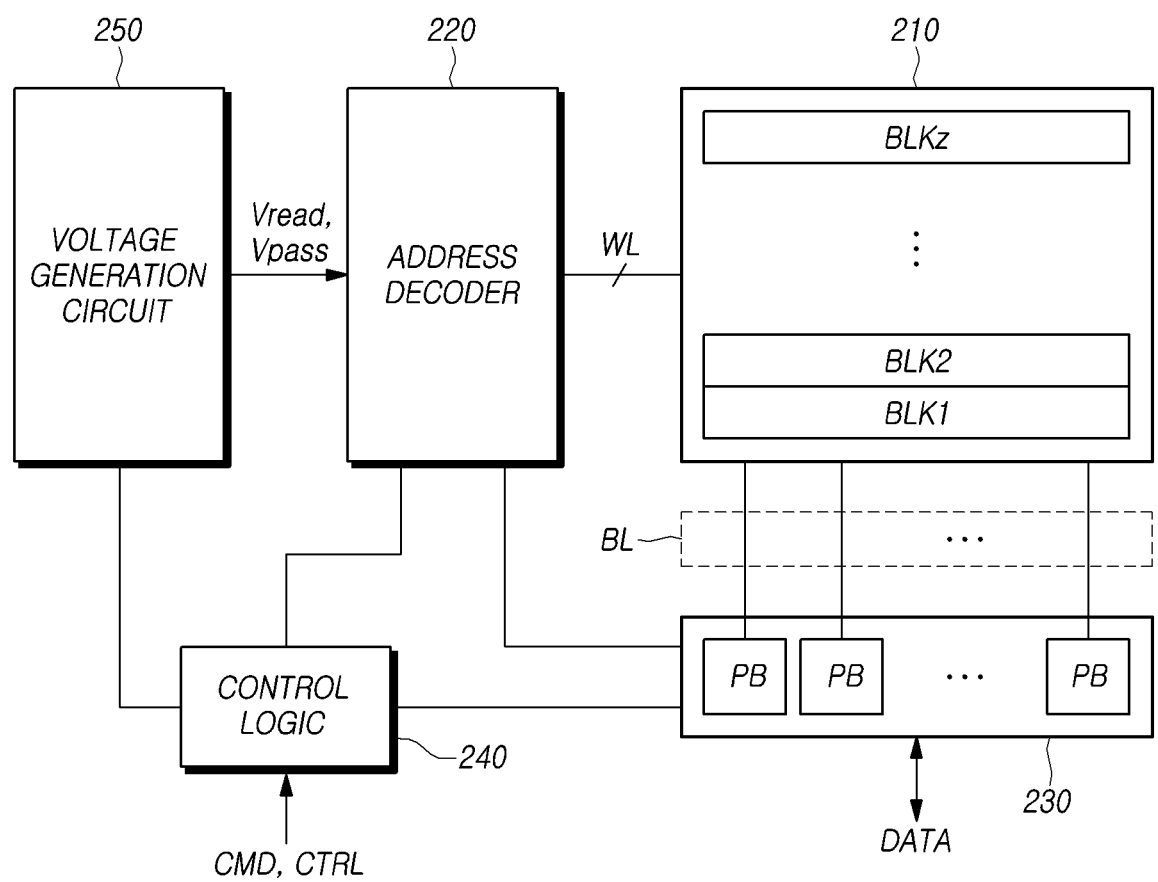
FIG. 2 is a detailed diagram of a memory shown in FIG. 1.

FIG. 2 is a detailed diagram of the memory 110 shown in FIG. 1.

Referring to FIG. 2, the memory 110 may include a memory cell array 210, an address decoder 220, a read and write circuit 230, a control logic 240, and a voltage generation circuit 250.

The memory cell array 210 may include a plurality of memory blocks BLK1 to BLKz, where z is a natural number of 2 or greater.

In the plurality of memory blocks BLK1 to BLKz, a plurality of word lines WL and a plurality of bit lines BL may be disposed, and a plurality of memory cells may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be non-volatile memory cells, and may be configured by non-volatile memory cells that have vertical channel structures.

The memory cell array 210 may be configured by a memory cell array having a two-dimensional structure or may be configured by a memory cell array having a three-dimensional structure.

Each of the plurality of memory cells included in the memory cell array 210 may store at least 1-bit data. For instance, each of the plurality of memory cells included in the memory cell array 210 may be a signal level cell (SLC) capable of storing 1-bit data. In another instance, each of the plurality of memory cells included in the memory cell array 210 may be a multi-level cell (MLC) capable of storing 2-bit data. In still another instance, each of the plurality of memory cells included in the memory cell array 210 may be a triple level cell (TLC) capable of storing 3-bit data. In yet another instance, each of the plurality of memory cells included in the memory cell array 210 may be a quad level cell (QLC) capable of storing 4-bit data. In a further instance, the memory cell array 210 may include a plurality of memory cells, each of which is capable of storing 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may operate under the control of the control logic 240.

The address decoder 220 may receive an address through an input/output buffer in the memory 110. The address decoder 220 may decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may decode a column address in the received address. The address decoder 220 may transmit the decoded column address to the read and write circuit 230.

A read operation and a program operation of the memory 110 may be performed with the unit of a page. An address received when a read operation or a program operation is requested may include at least one of a block address, a row address and a column address.

The address decoder 220 may select one memory block and one word line depending on a block address and a row address. A column address may be decoded by the address decoder 220 and be provided to the read and write circuit 230.

The address decoder 220 may include at least one of a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. In an embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may control general operations of the memory 110 under the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell may include a drain, a source and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
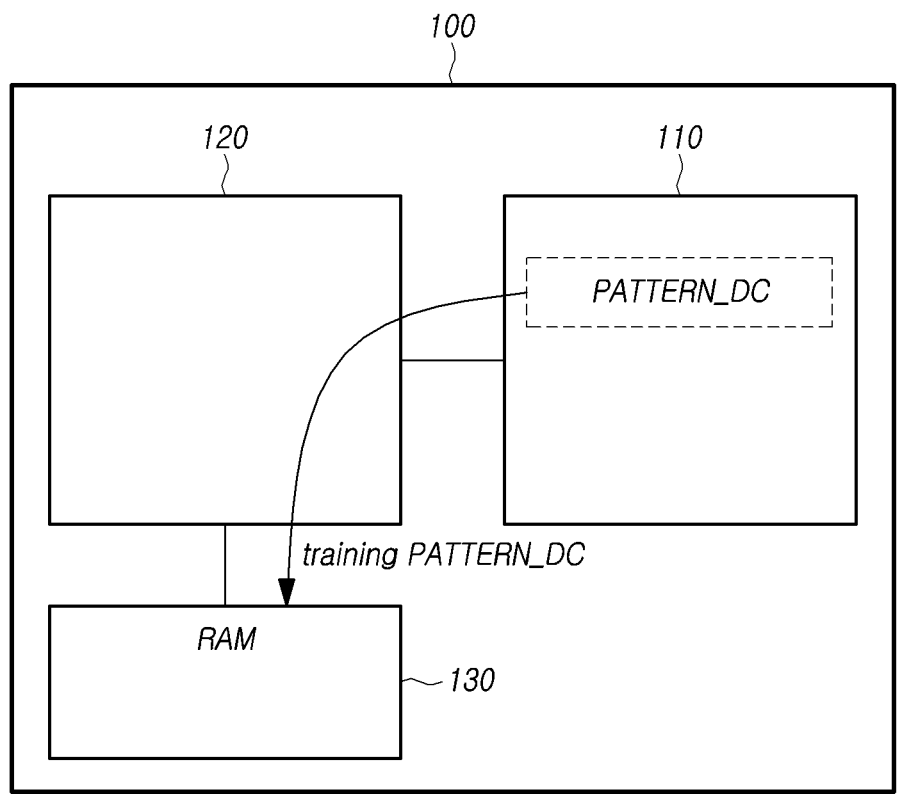
FIG. 3 is a block diagram illustrating a storage device according to an embodiment of the present disclosure.

FIG. 3 is a diagram illustrating the storage device 100 according to an embodiment of the present disclosure.

Referring to FIG. 3, the storage device 100 may include the memory 110, the controller 120 and a random access memory 130. Hereinafter, the memory 110 is described as a non-volatile memory.

The non-volatile memory 110 may store a pattern data chunk PATTERN_DC which is to be written to the random access memory 130 when the storage device 100 is powered on.

For example, the pattern data chunk PATTERN_DC may be data having a set size (e.g., 4 KB or 8 KB). The size of the pattern data chunk PATTERN_DC may correspond to a multiple of the size of a page included in the non-volatile memory 110.

The pattern data chunk PATTERN_DC may be stored in a specific area inside the non-volatile memory 110. For example, the pattern data chunk PATTERN_DC may be stored in a dedicated memory block allocated to store the pattern data chunk PATTERN_DC, among a plurality of memory blocks included in the non-volatile memory 110. Further, the pattern data chunk PATTERN_DC may be stored in a memory block for storing meta data, among a plurality of memory blocks.

The controller 120 may write the pattern data chunk PATTERN_DC stored in the non-volatile memory 110 to the random access memory 130 when the storage device 100 is powered on. To this end, the controller 120 may read the pattern data chunk PATTERN_DC from the non-volatile memory 110.

In addition, the controller 120 may read the pattern data chunk PATTERN_DC back from the random access memory 130.

In embodiments of the present disclosure, an operation of writing specific data (e.g., pattern data chunk PATTERN_DC) to the random access memory 130 and then reading the written data back will be referred to as a training operation.

The random access memory 130 may be coupled to the controller 120, and may store data used for the operation of the controller 120.

For example, the random access memory 130 may store a part of a mapping table indicating a mapping relationship between logical addresses and physical addresses.

Further, the random access memory 130 may temporarily store data to be written in the non-volatile memory 110 or data read from the non-volatile memory 110.

Hereinafter, an example of an operation of the storage device 100 upon power-on with reference to FIG. 4 will be described.

Figure 4:
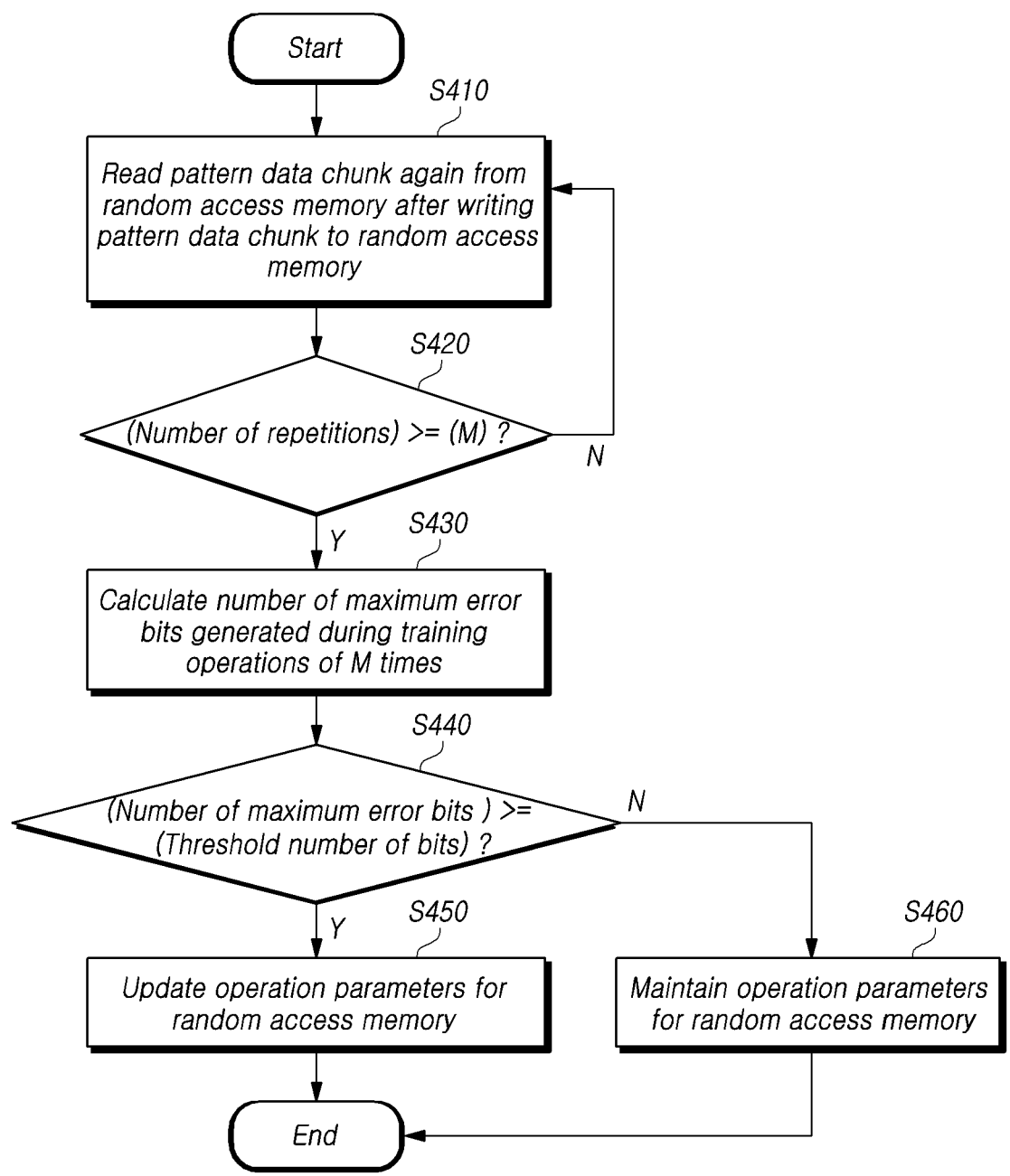
FIG. 4 is a flowchart for describing an operation of a storage device upon power-on according to an embodiment of the present disclosure.

FIG. 4 is a flowchart for describing an operation of the storage device 100 upon power-on according to an embodiment of the present disclosure.

Referring to FIG. 4, the controller 120 of the storage device 100 may execute a training operation of writing the pattern data chunk PATTERN_DC to the random access memory 130 and then reading the pattern data chunk PATTERN_DC back from the random access memory 130 (operation S410).

The controller 120 may execute a training operation of writing the pattern data chunk PATTERN_DC to the random access memory 130 and reading the pattern data chunk PATTERN_DC back from the random access memory 130, M times, where M is a natural number. To this end, the controller 120 may determine whether the number of repetitions of the training operation is greater than or equal to M times (operation S420), and may re-execute the operation S410 if the number of repetitions of the training operation is less than M times ('N' in the operation S420).

If the number of repetitions of the training operation is M or more ('Y' in the operation S420), the controller 120 may calculate the number of maximum error bits generated during the training operations of M times (operation S430).

In this case, the number of maximum error bits may be determined as the greatest value among the number of error bits generated during the training operations of M times.

The number of error bits generated during the training operation for the pattern data chunk PATTERN_DC may determine the number of data bits whose values do not match as a result of comparing the data bits of the pattern data chunk PATTERN_DC written to the random access memory 130 and the data bits of the pattern data chunk PATTERN_DC read back from the random access memory 130.

In addition, the controller 120 may determine whether the number of maximum error bits calculated in the operation S430 is greater than or equal to the set threshold number of bits (operation S440).

In this case, the threshold number of bits may be, for example, the maximum value of the number of error bits capable of self-correcting the pattern data chunk PATTERN_DC by the controller 120. For example, in the case that the controller 120 can correct error bits of up to 2 bits in the pattern data chunk PATTERN_DC, the threshold number of bits may be 2.

If the number of maximum error bits is greater than or equal to the threshold number of bits ('Y' in the operation S440), the controller 120 may update one or more operation parameters for the random access memory 130 (operation S450).

In the case that the random access memory 130 operates normally, the pattern data chunk PATTERN_DC written to the random access memory 130 and the pattern data chunk PATTERN_DC read back from the random access memory 130 may be identical. However, if the random access memory 130 malfunctions, there may occur a difference between the pattern data chunk PATTERN_DC written to the random access memory 130 and the pattern data chunk PATTERN_DC read back from the random access memory 130.

Therefore, since the fact that the number of maximum error bits is greater than or equal to the threshold number of bits means that the random access memory 130 is highly likely to malfunction, the controller 120 is required to update operation parameters for the random access memory 130 to increase reliability of the random access memory 130.

In the case that the number of maximum error bits is less than the threshold number of bits ('N' in the operation S440), the controller 120 may maintain operation parameters for the random access memory 130 (operation S460). The fact that the number of maximum error bits is less than the threshold number of bits means that the random access memory 130 is highly likely to operate normally based on the currently set operation parameters.

Accordingly, the pattern data chunk PATTERN_DC may perform an important function in determining operation parameters for the random access memory 130 to operate normally.

Therefore, the storage device 100 is required to determine the pattern data chunk PATTERN_DC optimized for the random access memory 130. If a fixed pattern data chunk PATTERN_DC is used without considering the characteristics (e.g., process variation according to the PCB) of the random access memory 130, there is a possibility that the operation parameters for the random access memory 130 are not normally set. If the operation parameters for the random access memory 130 are not normally set, there may occur a bit-flip during an operation of writing data to the random access memory 130 or reading data from the random access memory 130.

Hereinafter, an operation in which the storage device 100 determines the pattern data chunk PATTERN_DC optimized for the random access memory 130 with reference to FIG. 5, will be described.

Figure 5:
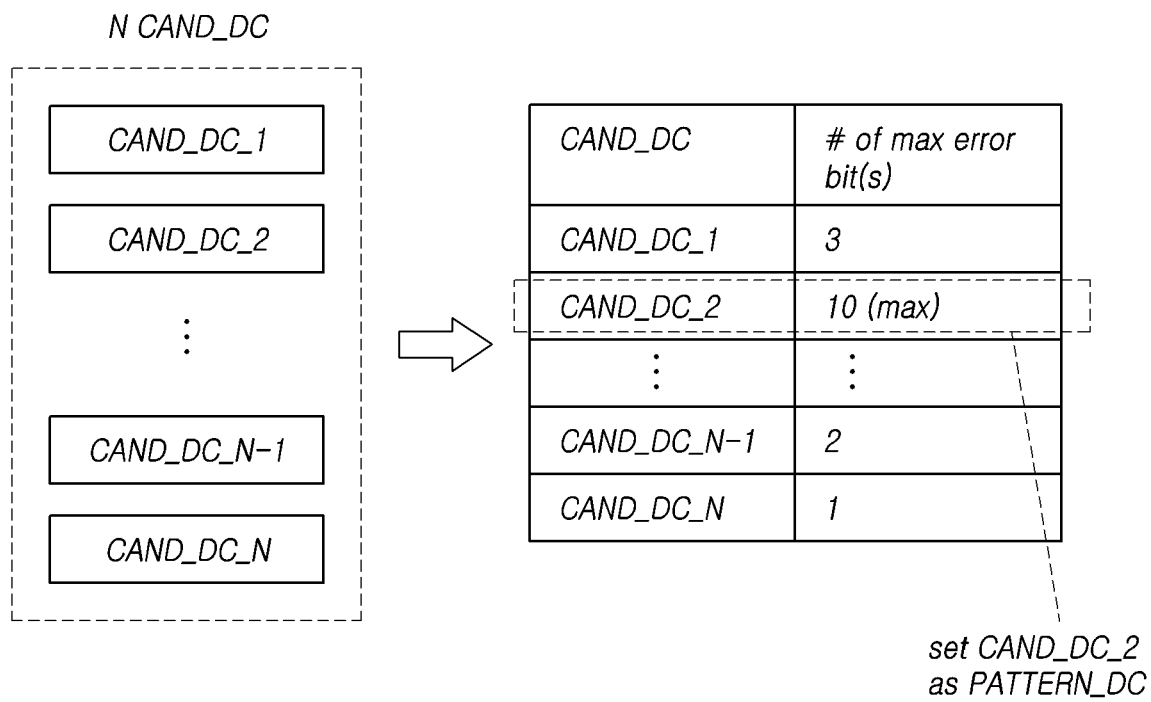
FIG. 5 is a diagram for describing an operation of determining a pattern data chunk by a storage device according to an embodiment of the present disclosure.

FIG. 5 is a diagram for describing an operation of determining a pattern data chunk PATTERN_DC by the storage device 100 according to an embodiment of the present disclosure.

First, the controller 120 of the storage device 100 may generate N candidate data chunks CAND_DC, where N is a natural number greater than or equal to 2. In FIG. 5, candidate data chunks CAND_DC_1, CAND_DC_2, ..., CAND_DC_N−1, and CAND_DC_N may be N candidate data chunks CAND_DC.

The controller 120 may create the N candidate data chunks CAND_DC in various ways.

For example, the controller 120 may randomly create N candidate data chunks CAND_DC according to a seed determined by a set reference time.

In this case, the reference time may be determined in various ways. For example, the reference time may be the current time. Further, the reference time may be a power-on time of the storage device 100. Moreover, the reference time may be a time indicated by a timestamp received from the outside of the storage device 100 (e.g., received from a host).

The controller 120 may execute a training operation of writing each candidate data chunk to the random access memory 130 and then reading it back, M times, for each of the N candidate data chunks CAND_DC_1, CAND_DC_2, ..., CAND_DC_N−1, CAND_DC_N. This may be the same as the operation described in FIG. 4.

The controller 120 may set a candidate data chunk having the greatest number of maximum error bits generated during the training operations of M times, among the N candidate data chunks CAND_DC_1, CAND_DC_2, ..., CAND_DC_N−1, CAND_DC_N as the pattern data chunk PATTERN_DC. This is to minimize the possibility of the malfunction of the random access memory 130 by updating the operation parameters for the random access memory 130 based on the data chunk in which the most error bits occur.

In FIG. 5, among the N candidate data chunks CAND_DC_1, CAND_DC_2, ..., CAND_DC_N−1, CAND_DC_N, the number of maximum error bits for a candidate data chunk CAND_DC_2 is 10, which is the greatest. Accordingly, the controller 120 may set the candidate data chunk CAND_DC_2 as the pattern data chunk PATTERN_DC.

Above, a configuration in which the storage device 100 sets the pattern data chunk PATTERN_DC and sets the operation parameters for the random access memory 130 using the pattern data chunk (PATTERN_DC) upon power-on, has been described.

Hereinafter, details of operation parameters for the random access memory 130 will be described.

Figure 6:
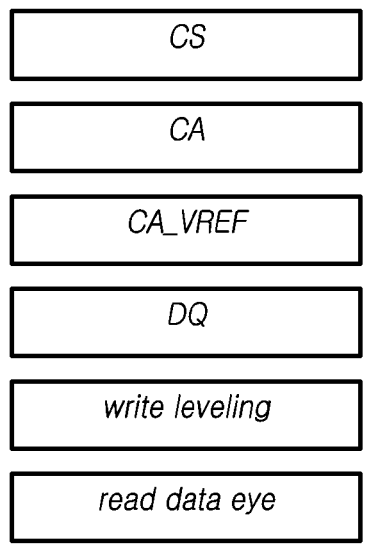
FIG. 6 a diagram for describing operation parameters for a random access memory according to an embodiment of the present disclosure.

FIG. 6 is a diagram for describing operation parameters for the random access memory 130 according to an embodiment of the present disclosure.

Referring to FIG. 6, operation parameters for the random access memory 130 may include at least one of a chip select (CS) signal, a command/address (CA) signal, a command/address reference voltage (CA_VREF) signal, a data channel (DQ) signal, a write leveling, and a read data eye. The operation parameters are elements that affect the operation of the random access memory 130, and may be updated based on the result of the training operations.

As described above, in the case that the number of maximum error bits generated during training operations of M times for the pattern data chunk PATTERN_DC is greater than or equal to the set threshold number of bits, the controller 120 may update operation parameters for the random access memory 130 described above.

In this case, each of the operation parameters may have a value within a preset interval (e.g., 0 to 511). When updating the operation parameters, the controller 120 may increase (e.g., 10→20) each value of the operation parameters within the preset interval.

After updating the operation parameters for the random access memory 130, the controller 120 may re-execute a training operation of writing the pattern data chunk PATTERN_DC to the random access memory 130 and reading it back. This is to check whether the random access memory 130 operates normally after updating the operation parameters for the random access memory 130.

Figure 7:
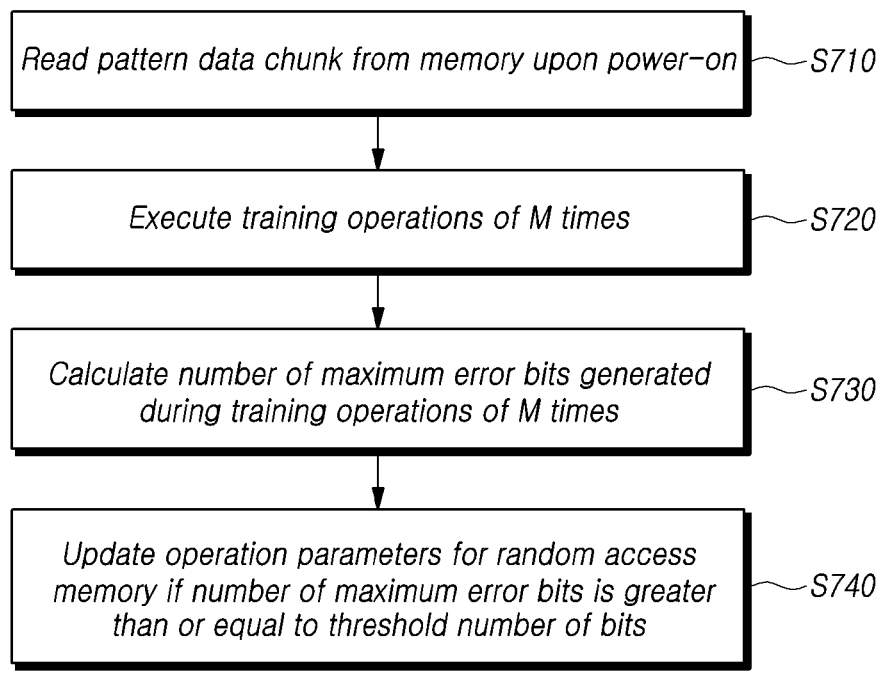
FIG. 7 a flowchart for describing an operating method of a storage device according to an embodiment of the present disclosure.

FIG. 7 is a flowchart for describing an operating method of the storage device 100 according to an embodiment of the present disclosure.

Referring to FIG. 7, an operating method of the storage device 100 may include reading the pattern data chunk PATTERN_DC from the non-volatile memory 110 upon power-on (operation S710).

For example, the pattern data chunk PATTERN_DC may be set to, among N candidate data chunks CAND_DC, where N is a natural number equal to or greater than 2, a candidate data chunk having the greatest number of error bits generated during the training operations of M times of reading each candidate data chunk back after writing each candidate data chunk to the random access memory 130. In this case, the candidate data chunks CAND_DC may be randomly created according to a seed determined by a set reference time.

In addition, the operating method of the storage device 100 may include executing a training operation of writing the pattern data chunk PATTERN_DC read in the operation S710 to the random access memory 130 and then reading the pattern data chunk PATTERN_DC back from the random access memory 130, M times, where M is a natural number (operation S720).

The operating method of the storage device 100 may include calculating the number of maximum error bits generated during the operation which is executed M times in the operation S720 (operation S730).

In addition, the operating method of the storage device 100 may include updating one or more operation parameters for the random access memory 130 when the number of maximum error bits calculated in the operation S730 is greater than or equal to the set threshold number of bits (operation S740).

For example, the operation parameters may include at least one of a chip select (CS) signal, a command/address (CA) signal, a command/address reference voltage (CA_VREF) signal, a data channel (DQ) signal, a write leveling, and a read data eye.

Additionally, the operating method of the storage device 100 may further include re-executing, after updating the operation parameters in the operation S740, the training operation of writing the pattern data chunk PATTERN_DC to the random access memory 130 and then reading the pattern data chunk PATTERN_DC back from the random access memory 130.

Although embodiments of the present disclosure have been described for illustrative purposes, those skilled in the art will appreciate that various modifications, additions and substitutions are possible, without departing from the scope and spirit of the present disclosure. Therefore, the embodiments disclosed above and in the accompanying drawings should be considered in a descriptive sense only and not for limiting the technological scope. The technological scope of the present disclosure is not limited by the embodiments and the accompanying drawings. The spirit and scope of the present disclosure should be Interpreted in connection with the appended claims and encompass all equivalents falling within the scope of the appended claims. Furthermore, the embodiments may be combined to form additional embodiments.

What is claimed is:

1. A storage device comprising:
a random access memory;
a non-volatile memory including a plurality of memory blocks and configured to store a pattern data chunk to be written to the random access memory upon power-on; and
a controller configured to:
    execute training operations of writing the pattern data chunk to the random access memory and then reading the pattern data chunk back from the random access memory, M times, upon power-on, where M is a natural number, and
    update one or more operation parameters for the random access memory when a number of maximum error bits generated during the training operations of M times is greater than or equal to a threshold number of bits,
wherein the controller is configured to:
execute, for each of N candidate data chunks, the training operations M times by reading each candidate data chunk back after writing each candidate data chunk to the random access memory, and
set, as the pattern data chunk, a candidate data chunk having a greatest number of maximum error bits generated during the training operations of M times, among the N candidate data chunks, where N is a natural number of 2 or more.

2. The storage device of claim 1,
wherein the pattern data chunk is stored in a dedicated memory block allocated to store the pattern data chunk, among the plurality of memory blocks, or
wherein the pattern data chunk is stored in a memory block for storing meta data, among the plurality of memory blocks.

3. The storage device of claim 1, wherein the controller is configured to randomly create the N candidate data chunks according to a seed determined by a reference time.

4. The storage device of claim 1, wherein the one or more operation parameters include at least one of a chip select signal, a command/address signal, a command/address reference voltage signal, a data channel signal, a write leveling, and a read data eye.

5. The storage device of claim 4,
wherein each of the one or more operation parameters has a value within a preset interval, and
wherein the controller is further configured to increase the value of each of the one or more operation parameters within the preset interval when updating the one or more operation parameters.

6. The storage device of claim 1, wherein the controller is further configured to re-execute, after updating the one or more operation parameters, a training operation by reading the pattern data chunk from the random access memory back after writing the pattern data chunk to the random access memory.

7. The storage device of claim 1, wherein the N candidate data chunks comprise different data patterns.

8. The storage device of claim 1, wherein the controller, for the N candidate data chunks, randomly creates the N candidate data chunks.

9. The storage device of claim 8, wherein the randomly created N candidate data chunks use, as a seed for randomization, a set reference time.

10. An operating method of a storage device including a controller, a non-volatile memory, and a random access memory, the operating method comprising:
- reading, by the controller, a pattern data chunk from the non-volatile memory upon power-on;
- executing, by the controller, a training operations of writing the pattern data chunk to the random access memory and then reading the pattern data chunk back from the random access memory, M times, where M is a natural number;
- calculating, by the controller, a number of maximum error bits generated during the training operations of M times; and
- updating, by the controller, one or more operation parameters for the random access memory when the number of maximum error bits is greater than or equal to a threshold number of bits,
- wherein among N candidate data chunks, a candidate data chunk having a largest number of maximum error bits generated during the training operations of M times is set as the pattern data chunk, where N is a natural number of 2 or more.

11. The operating method of claim 10, wherein the N candidate data chunks are randomly created according to a seed determined by a reference time.

12. The operating method of claim 10, wherein the one or more operation parameters include at least one of a chip select signal, a command/address signal, a command/address reference voltage signal, a data channel signal, a write leveling, and a read data eye.

13. The operating method of claim 10, further comprising re-executing, after updating the one or more operation parameters, a training operation by reading the pattern data chunk from the random access memory back after writing the pattern data chunk to the random access memory.

* * * * *